(12) United States Patent
Hayashi

(10) Patent No.: US 12,141,604 B2
(45) Date of Patent: Nov. 12, 2024

(54) ARITHMETIC OPERATION METHOD AND ARITHMETIC OPERATION INSTRUCTION SYSTEM

(71) Applicant: Hitachi, Ltd., Tokyo (JP)

(72) Inventor: Shinichi Hayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 560 days.

(21) Appl. No.: 17/480,189

(22) Filed: Sep. 21, 2021

(65) Prior Publication Data
US 2022/0300319 A1   Sep. 22, 2022

(30) Foreign Application Priority Data

Mar. 19, 2021   (JP) .................................. 2021-045566

(51) Int. Cl.
*G06F 9/48* (2006.01)
*G06F 7/57* (2006.01)
*G06F 9/50* (2006.01)

(52) U.S. Cl.
CPC ................ *G06F 9/485* (2013.01); *G06F 7/57* (2013.01); *G06F 9/505* (2013.01)

(58) Field of Classification Search
None
See application file for complete search history.

(56) References Cited

U.S. PATENT DOCUMENTS

| | | | |
|---|---|---|---|
| 9,720,732 B1 | 8/2017 | Shih et al. | |
| 2005/0222884 A1* | 10/2005 | Ehret | G06Q 10/06312 |
| | | | 705/7.22 |
| 2005/0268299 A1* | 12/2005 | Picinich | G06F 9/50 |
| | | | 718/100 |
| 2010/0166208 A1* | 7/2010 | Kato | H04R 5/0335 |
| | | | 381/74 |
| 2014/0229221 A1 | 8/2014 | Shih et al. | |

(Continued)

FOREIGN PATENT DOCUMENTS

JP   2016-507121 A   3/2016

OTHER PUBLICATIONS

Extended European Search Report received in corresponding European Application No. 21196913.4 dated Feb. 17, 2022.

*Primary Examiner* — Adam Lee
(74) *Attorney, Agent, or Firm* — MATTINGLY & MALUR, PC

(57) ABSTRACT

An arithmetic operation method in which data processing can be executed no later than a designated date and time upon consideration of a forced stoppage of tasks. The method includes: a simultaneous execution quantity calculation step of calculating a simultaneous execution quantity of the subtasks based on resources used by each of the subtasks and available resources at each time of day; an inexpensive remaining quantity calculation step of creating an inexpensive executability table indicating an inexpensive remaining quantity that is a quantity of tasks which may be executed by the inexpensive execution unit at each time of day on the basis of a completion date and time when the arithmetic operations of the plurality of subtasks should be completed, and the simultaneous execution quantity; and an execution instruction step of causing each of the subtasks to be executed by either of the inexpensive or expensive execution units.

20 Claims, 10 Drawing Sheets

(56) References Cited

U.S. PATENT DOCUMENTS

| | | | |
|---|---|---|---|
| 2014/0244334 A1* | 8/2014 | De | G06Q 10/063118 |
| | | | 705/7.17 |
| 2014/0282520 A1* | 9/2014 | Sabharwal | G06F 9/455 |
| | | | 718/1 |
| 2017/0091771 A1* | 3/2017 | Kaibara | H04N 1/00342 |
| 2019/0347603 A1* | 11/2019 | Vácha | G06F 9/451 |
| 2020/0034209 A1 | 1/2020 | Matsuura et al. | |
| 2020/0125400 A1 | 4/2020 | Venkataraman et al. | |
| 2020/0286164 A1* | 9/2020 | Kade | G06Q 20/42 |

\* cited by examiner

| TASK ID | STAR-TING DATE AND TIME | COMP-LETION DATE AND TIME | CONTAINER IMAGE | ENVIRO-NMENT VARIABLE NAME | ENVIRO-NMENT VARIABLE VALUE | THE NUM-BER OF VCPUS | MEM-ORY CAPA-CITY |
|---|---|---|---|---|---|---|---|
| TASK 0 | 2020/12/25 19:00 | 2020/12/26 13:00 | example.com/image0:latest | SUBTASK_ID | 1,2,3,4,5,6,7,8,9 | 2 | 2048 MB |
| TASK 1 | 2020/12/26 19:00 | 2020/12/27 13:00 | example.com/image1:latest | SUBTASK_ID | 1,2,3,4,5,6,7,8,9 | 4 | 4096 MB |
| : | : | : | : | : | : | : | : |

| TASK ID | SUBTASK ID | ENVIRONMENT VARIABLE NAME | ENVIRONMENT VARIABLE VALUE | STATUS | CONTAINER ID |
|---|---|---|---|---|---|
| TASK 0 | SUBTASK 1 | SUBTASK_ID | 1 | COMPLETED | - |
| TASK 0 | SUBTASK 2 | SUBTASK_ID | 2 | BEING EXECUTED | C2 |
| TASK 0 | SUBTASK 3 | SUBTASK_ID | 3 | UNEXECUTED | - |
| TASK 1 | SUBTASK 11 | SUBTASK_ID | 1 | UNEXECUTED | - |
| : | : | : | : | : | : |

| TASK ID | DATE AND TIME | MAXIMUM PARALLELISM DEGREE |
|---|---|---|
| TASK 0 | 2020/12/25 19:00 | 3 |
| TASK 0 | 2020/12/25 22:00 | 2 |
| : | : | : |

| TASK ID | INEXPENSIVE REMAINING QUANTITY | DATE AND TIME |
|---|---|---|
| TASK 0 | 0 | 2020/12/26 4:00 |
| TASK 0 | 2 | 2020/12/26 2:00 |
| TASK 0 | 4 | 2020/12/26 0:00 |
| TASK 0 | 6 | 2020/12/25 22:00 |
| : | : | : |

FIG. 9

| DB ID | CONNECTION DESTINATION | THE NUMBER OF VCPUS |
|---|---|---|
| DB 0 | db0.example.com | 4 |
| DB 1 | db1.example.com | 8 |
| ⋮ | ⋮ | ⋮ |

FIG. 10

| DB ID | DATE AND TIME | AVERAGE CPU UTILIZATION RATE |
|---|---|---|
| DB 0 | 2020/12/25 12:00 | 30% |
| DB 0 | 2020/12/25 12:01 | 33% |
| ⋮ | ⋮ | ⋮ |

| CONNECTION LINE ID | DATE AND TIME | TRANSMITTED AMOUNT | RECEIVED AMOUNT |
|---|---|---|---|
| LINE 0 | 2020/12/25 12:00 | 20% | 10% |
| LINE 0 | 2020/12/25 12:01 | 24% | 31% |
| : | : | : | : |

| STORAGE ID | CONNECTION DESTINATION |
|---|---|
| STORAGE 0 | storage0.example.com |
| STORAGE 1 | storage1.example.com |
| : | : |

181 / 182

ARITHMETIC OPERATION METHOD AND ARITHMETIC OPERATION INSTRUCTION SYSTEM

CROSS-REFERENCE TO RELATED APPLICATION

The present application claims priority from Japanese application JP 2021-045566, filed on Mar. 19, 2021, the contents of which is hereby incorporated by reference into this application.

TECHNICAL FIELD

The present invention relates to an arithmetic operation method and an arithmetic operation instruction system.

BACKGROUND ART

There is a widely known service which enables an unspecified large number of users to use arithmetic operation resources by paying fees. PTL 1 discloses a computer implementation method including: receiving a definition of a task, wherein the definition includes a necessary deadline time of day and the necessary deadline time of day includes a user designated deadline for the completion of execution of the task; deciding an estimated time period for completing the execution of the task with respect to each of a plurality of computing resources; selecting one or more computing resources among the computing resources on the basis of an estimated cost for completing the execution of the task with respect to each of the plurality of computing resources; and starting the execution of the task at a time of day which is scheduled and set by using the selected one or more computing resources, wherein the scheduled and set time of day is earlier than the necessary deadline time of day by at least the estimated time period.

CITATION LIST

Patent Literature

PTL 1: Japanese Patent Application No. 2015-557200

SUMMARY OF THE INVENTION

Problems to be Solved by the Invention

The invention described in PTL 1 cannot execute data processing by a designated date and time in consideration of forced stoppage.

Means to Solve the Problems

An arithmetic operation method according to a first aspect of the present invention is an arithmetic operation method executed by a computer for performing arithmetic operations of a plurality of subtasks by using an arithmetic operation system equipped with an inexpensive execution unit for which a usage fee is inexpensive, but which may possibly be forcibly stopped, and an expensive execution unit for which a usage fee is expensive, but which will never be forcibly stopped, wherein the arithmetic operation method includes: a simultaneous execution quantity calculation step of calculating a simultaneous execution quantity of the subtasks at each time of day on the basis of resources used by each of the subtasks and available resources at each time of day; an inexpensive remaining quantity calculation step of creating an inexpensive executability table indicating an inexpensive remaining quantity that is a quantity of tasks which may be executed by the inexpensive execution unit at each time of day on the basis of a completion date and time when the arithmetic operations of the plurality of subtasks should be completed, and the simultaneous execution quantity; and an execution instruction step of causing each of the subtasks to be executed by either the inexpensive execution unit or the expensive execution unit with reference to the inexpensive executability table.

An arithmetic operation instruction system according to a second aspect of the present invention is an arithmetic operation instruction system for performing arithmetic operations of a plurality of subtasks by using an arithmetic operation system equipped with an inexpensive execution unit for which a usage fee is inexpensive, but which may possibly be forcibly stopped, and an expensive execution unit for which a usage fee is expensive, but which will never be forcibly stopped, wherein the arithmetic operation instruction system includes: a simultaneous execution quantity calculation unit that calculates a simultaneous execution quantity of the subtasks at each time of day on the basis of resources used by each of the subtasks and available resources at each time of day; an inexpensive remaining quantity calculation unit that creates an inexpensive executability table indicating an inexpensive remaining quantity that is a quantity of tasks which may be executed by the inexpensive execution unit at each time of day on the basis of a completion date and time when the arithmetic operations of the plurality of subtasks should be completed, and the simultaneous execution quantity; and an execution instruction unit that causes each of the subtasks to be executed by either the inexpensive execution unit or the expensive execution unit with reference to the inexpensive executability table.

Advantageous Effects of the Invention

According to the present invention, the data processing can be executed no later than the designated date and time in consideration of forced stoppage of a task(s).

BRIEF DESCRIPTION OF DRAWINGS

FIG. 3 is a diagram illustrating an example of task information 100;

FIG. 4 is a diagram illustrating an example of subtask information 110;

FIG. 7 is a diagram illustrating an example of maximum parallelism degree information 140;

FIG. 8 is a diagram illustrating an example of an inexpensive executability table 150;

FIG. 9 is a diagram illustrating an example of DB information 155;

FIG. 10 is a diagram illustrating an example of DB operation information 160;

FIG. 11 is a diagram illustrating an example of connection line operation information 170;

FIG. 12 is a diagram illustrating an example of storage information 180;

DESCRIPTION OF EMBODIMENTS

First Embodiment

A first embodiment of a container execution management system will be explained below with reference to FIG. 1 to FIG. 15. Incidentally, the embodiment explained below does not limit the invention according to claims and miscellaneous elements explained in the embodiment and all combinations of the elements are not necessarily requisite for the solving means of the invention.

Figure 1:
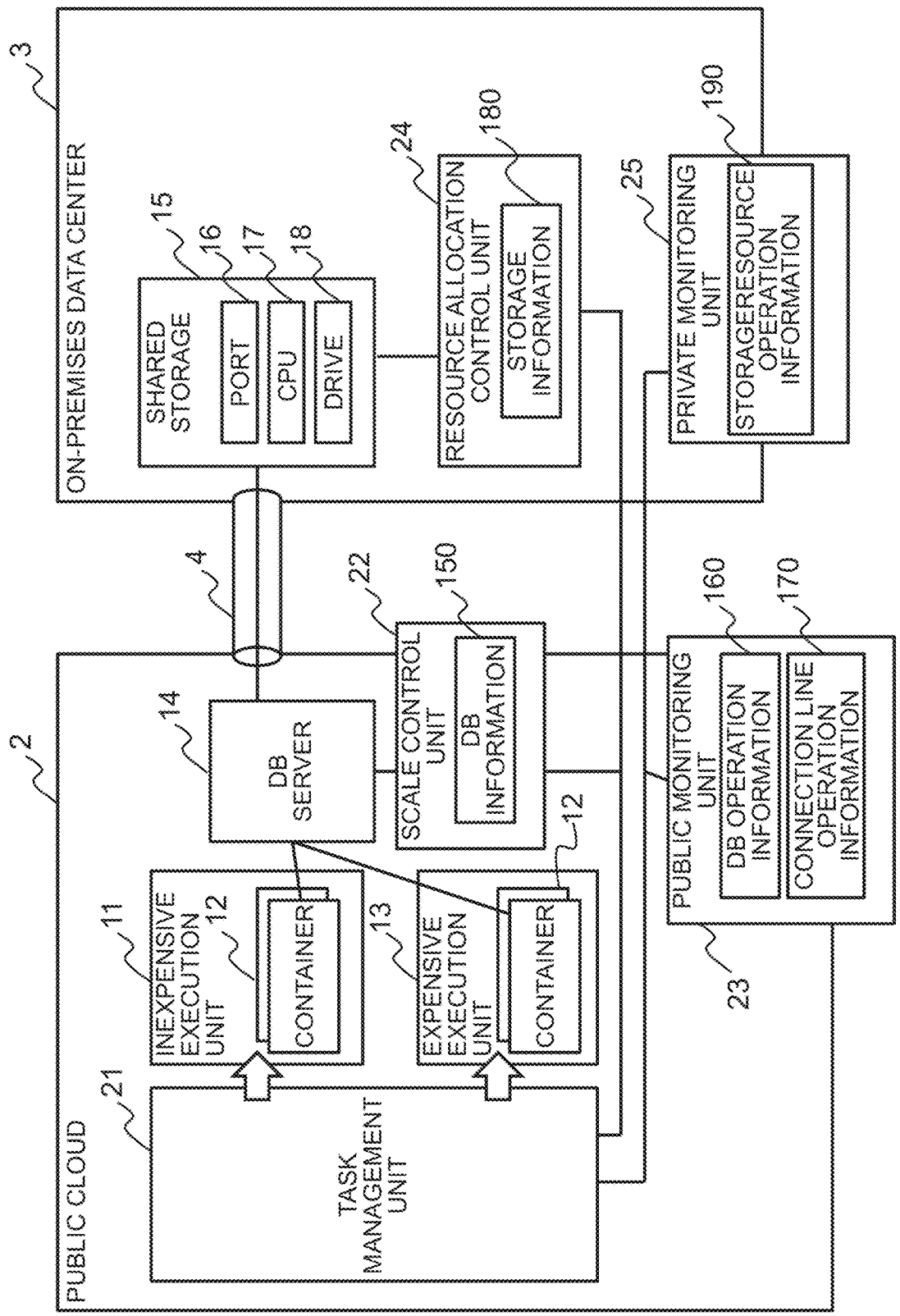
FIG. 1 is an overall configuration diagram of a container execution management system 1.

FIG. 1 is an overall configuration diagram of a container execution management system 1. The container execution management system 1 includes a public cloud 2 and an on-premises data center 3 and they are coupled together via a connection line 4. Arithmetic operations in the public cloud 2 and the on-premises data center 3 are executed by a CPU which is a central processing unit by decompressing programs stored in a ROM which is a read-only storage device onto a RAM which is a readable/writable storage device and executing the programs. However, at least one of the arithmetic operations describe later may be implemented by an FPGA (Field Programmable Gate Array) which is a rewritable logical circuit, or an ASIC (Application Specific Integrated Circuit) which is an application specific integrated circuit, instead of a combination of the CPU, the ROM, and the RAM. Furthermore, these arithmetic operations may be implemented by a different combination of configurations, for example, a combination of the CPU, the ROM, the RAM, and the FPGA instead of the combination of the CPU, the ROM, and the RAM.

The public cloud 2 includes one or a plurality of data centers and has enormous arithmetic operation resources. The public cloud 2 is used by an unspecified large number of companies and organizations and they pay a usage fee to an administrator (hereinafter referred to as a "service provider") of the public cloud 2 according to the usage.

The on-premises data center 3 is a data center retained by a company which owns an IT system. Arithmetic operation resources of the on-premises data center 3 are more limited than those of the public cloud 2. The on-premises data center 3 may be a data center of a data center business entity which provides a collocation service. A user of the on-premises data center 3 (hereinafter referred to as an "operator") cannot take data outside due to, for example, safety reasons. In this embodiment, arithmetic processing which uses the arithmetic operation resources of the public cloud 2 while keeping the data at the on-premises data center 3 (hereinafter referred to as a "task").

Moreover, in this embodiment, a part(s) obtained by segmentalizing a task is called a "subtask(s)." Processing loads of subtasks are substantially the dame and every one of the subtasks requires substantially the same processing time. There is no dependency relation between the subtasks and their sequential execution order is arbitrary; and there is no problem even if a starting sequential order is different from a terminating sequential order.

The public cloud 2 includes an inexpensive execution unit 11, containers 12, an expensive execution unit 13, a DB server 14, a task management unit 21, a scale control unit 22, and a public monitoring unit 23. Each of the inexpensive execution unit 11, the expensive execution unit 13, the DB server 14, the task management unit 21, the scale control unit 22, and the public monitoring unit 23 may be implemented by an independent arithmetic operation apparatus, one or a plurality of them may be implemented by the same arithmetic operation apparatus, or one configuration may be implemented by a plurality of arithmetic operation apparatuses. The container 12 is electronic data including a program which the operator wishes to execute processing, and is executed by the inexpensive execution unit 11 or the expensive execution unit 13. In the following explanation, the inexpensive execution unit 11 and the expensive execution unit 13 will be hereinafter also collectively referred to as an "arithmetic operation system" and the task management unit 21 will be also referred to as an "arithmetic operation instruction system."

Some configurations of the public cloud 2 manage information. For example, the scale control unit 22 manages DB information 155. Management of information in this embodiment means to perform at least either reading or writing of the information. Areas in which these pieces of the information are stored are not particularly limited; however, such areas are illustrated as inside the configuration for managing the information in FIG. 1 for the sake of convenience.

The inexpensive execution unit 11 is a service for causing a container(s) 12 to operate. The inexpensive execution unit 11 may sometimes forcibly stop a container which is being executed for the service provider's convenience, but its usage fee is inexpensive. The inexpensive execution unit 11 has a low quality of service quality assurance (SLA: Service Level Agreement), so that it can be also called a low SLA. The expensive execution unit 13 is a service for causing a container(s) 12 to operate. The expensive execution unit 13 will never forcibly stop a container which is being executed, but its usage fee is expensive. The expensive execution unit 13 has a high quality of service quality assurance, so that it can be also called a high SLA.

The differences between the inexpensive execution unit 11 and the expensive execution unit 13 are the usage fee and whether the forced stoppage is possible or not and there is no difference in their performance. Specifically speaking, when the inexpensive execution unit 11 is used to execute a subtask and the subtask is not forcibly stopped, and when the expensive execution unit 13 is used to execute the same subtask, the time required to complete the execution is the same in both the above-described cases. Incidentally, in the following explanation, a subtask executed by using the inexpensive execution unit 11 will be hereinafter sometimes referred to as an "inexpensive subtask" for the sake of convenience and a subtask executed by using the expensive execution unit 13 will be hereinafter sometimes referred to as an "expensive subtask" for the sake of convenience.

The inexpensive execution unit 11 and the expensive execution unit 13 respectively exist in plurality and each of them executes subtasks obtained by segmentalizing a task. Incidentally, each of the inexpensive execution unit 11 and the expensive execution unit 13 may be provided as a service for executing arithmetic operations and a cluster(s) for executing the arithmetic operations may be provided. The DB server 14 is a database which accumulates data of the container(s) 12. As the processing of the container(s) 12 increases, the load on the DB server 14 increases.

The task management unit 21: judges whether a container 12 should be executed by the inexpensive execution unit 11 or the expensive execution unit 13; and issues an instruction to execute the container 12. Information managed by the task management unit 21 will be explained later. The scale control unit 22 increases/decrease necessary resources for the DB server 14. The public monitoring unit 23 monitors operations of the public cloud 2, specially speaking, operation information of the DB server 14 and the connection line 4. The public monitoring unit 23 manages DB operation information 160 and connection line operation information 170. The scale control unit 22 manages DB information 155 which is information about the DB server 14. The DB information 23 will be explained later.

The on-premises data center 3 includes a shared storage 15, a resource allocation control unit 24, and a private monitoring unit 25. Each of the shared storage 15, the resource allocation control unit 24, and the private monitoring unit 25 may be implemented by an independent arithmetic operation apparatus, one or a plurality of them may be implemented by the same arithmetic operation apparatus, or one configuration may be implemented by a plurality of arithmetic operation apparatuses. Furthermore, other programs which are not illustrated in the drawing also operate in the on-premises data center 3 and share arithmetic operation resources. In other words, the arithmetic operation resources are limited in the on-premises data center 3.

The shared storage 15 includes a port 16, a CPU 17, and a drive 18. Strictly speaking, the shared storage 15 is implemented by using the port 16, the CPU 17, and the drive 18 which are resources for the on-premises data center 3. The shared storage 15 stores data used for the arithmetic operation(s) by the container(s) 12, provides the data in response to requests from the container(s) 12 of the public cloud 2, and stores the received data. The port 16 is a port which is coupled to the connection line 4 and transmits and receives the data. The CPU 17 is a CPU for processing a data read/write command(s) received from the DB server 14. The drive 18 is a drive which accumulates the data.

Specifically speaking, the shared storage 15 is not merely a storage medium, but increases resources for realizing high-speed data reading/writing as necessary. However, since other programs are also operating as described earlier, it is desired that a minimum necessary amount of the port 16, the CPU 17, and the drive 18 which are used by the shared storage 15 should be provided.

The resource allocation control unit 24 controls an allocated amount of the port 16, the CPU 17, and the drive 18 to the shared storage 15. The resource allocation control unit 24 manages storage information 180. The private monitoring unit 25 monitors the on-premises data center 3; and specifically speaking, the private monitoring unit 25 manages operation information of the shared storage 15 and the connection line 4. The private monitoring unit 25 manages storage resource operation information 190.

Figure 2:
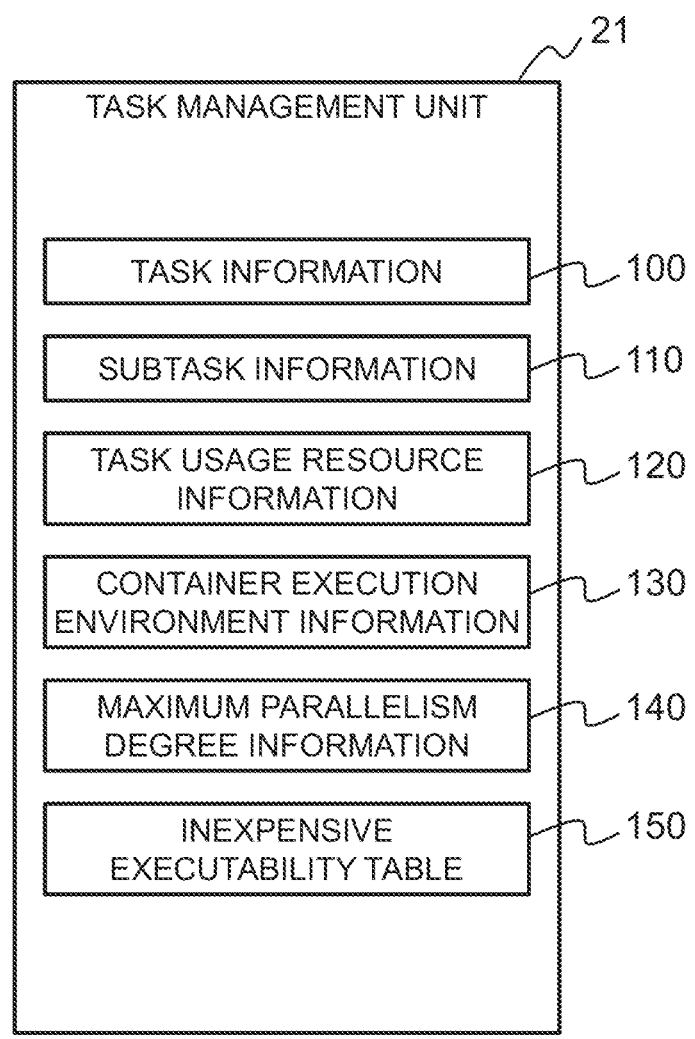
FIG. 2 is a diagram illustrating information managed by a task management unit 21.

FIG. 2 is a diagram illustrating information managed by the task management unit 21. The task management unit 21 manages task information 100, subtask information 110, task usage resource information 120, container execution environment information 130, maximum parallelism degree information 140, and an inexpensive executability table 150. These pieces of information will be explained with reference to FIG. 3 to FIG. 7.

FIG. 3 is a diagram illustrating an example of the task information 100. The task information 100 stores information about tasks. The task information 100 is configured of a plurality of records; and each record includes a task ID 101, a starting date and time 102, a completion date and time 103, a container image 104, an environment variable name 105, an environment variable value 106, the number of vCPUs 107, and a memory capacity 108.

The task ID 101 is an identifier for identifying the relevant task. The starting date and time 102 indicate a date and time to start the task. The completion date and time 103 indicate a date and time when the task should be completed. The container image 104 indicates a registration location, that is, a storage location of a container image for executing the task.

The environment variable name 105 indicates the name of an argument given to the container. The environment variable value 106 indicates a list of parameters for the subtask. In the example illustrated in FIG. 3, the environment variable value 106 displays parameters separated with a comma and subtasks as many as the number of elements are created. The number of vCPUs 107 indicates the number of vCPUs to be allocated to the container. The memory capacity 108 indicates a memory capacity to be allocated to the container. The operator registers the relevant task to the task management unit 21 by updating the task information 100.

FIG. 4 is a diagram illustrating an example of the subtask information 110. The subtask information 110 stores information about subtasks constituting a task. Once a task is registered in the task information 100 by the operator, the task management unit 21 updates the subtask information 110 based on the information registered in the task information. The subtask information 110 is configured of a plurality of records; and each record includes a task ID 111, a subtask ID 112, an environment variable name 113, an environment variable value 114, a status 115, and a container ID 116.

The task ID 111 is an identifier for identifying the relevant task and is information of the same type as the task ID 101 in FIG. 3. The subtask ID 112 indicates an identifier of the relevant subtask. The environment variable name 113 and the environment variable value 114 indicate an argument to be given to a container executed in the subtask. The status 115 indicates the status of the subtask. The container ID 116 is an identifier of a container used when the status 115 is "being executed." The task management unit 21 updates the status 115 of the relevant subtask when the status of the subtask is converted.

Figure 5:
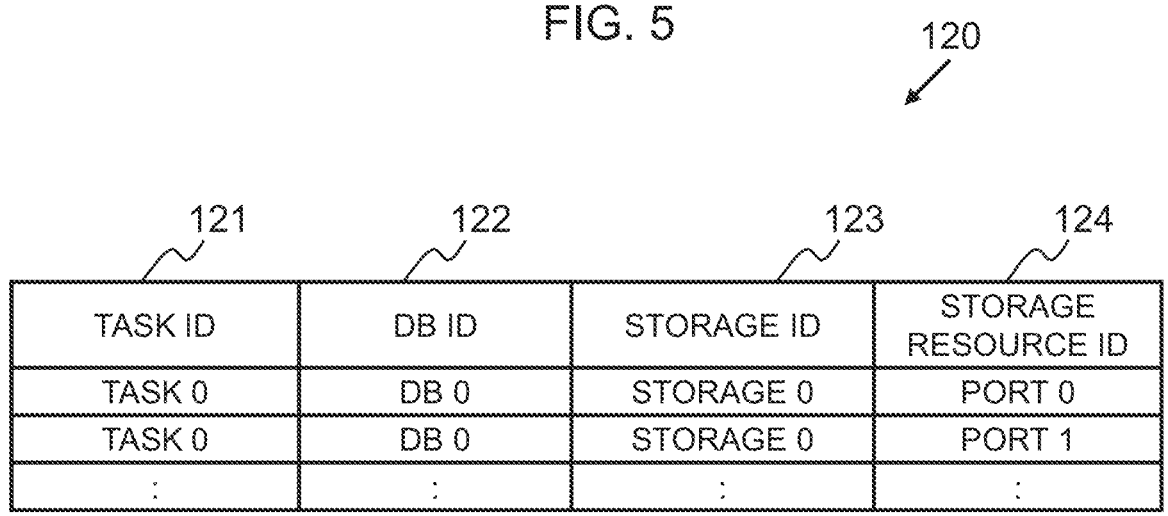
FIG. 5 is a diagram illustrating an example of task usage resource information 120.

FIG. 5 is a diagram illustrating an example of the task usage resource information 120. The task usage resource information 120 stores information of resources used by the relevant task. The task usage resource information 120 is updated by the operator. The task usage resource information 120 is configured of a plurality of records; and each record includes a task ID 121, a DB ID 122, a storage ID 123, and a storage resource ID 124.

The task ID 121 is an identifier for identifying the relevant task and is information of the same type as the task ID 101 in FIG. 3. The DB ID 122 indicates an identifier of a database used by the container, which is executed in the task, to store data. The storage ID 123 is an identifier of a storage unit which stores the data of the database. The storage resource ID 124 indicates an identifier of a resource for the storage unit used to store the data of the database. The resource ID is, for example, the ID of the port 16, the CPU 17, or the drive 18.

Figure 6:
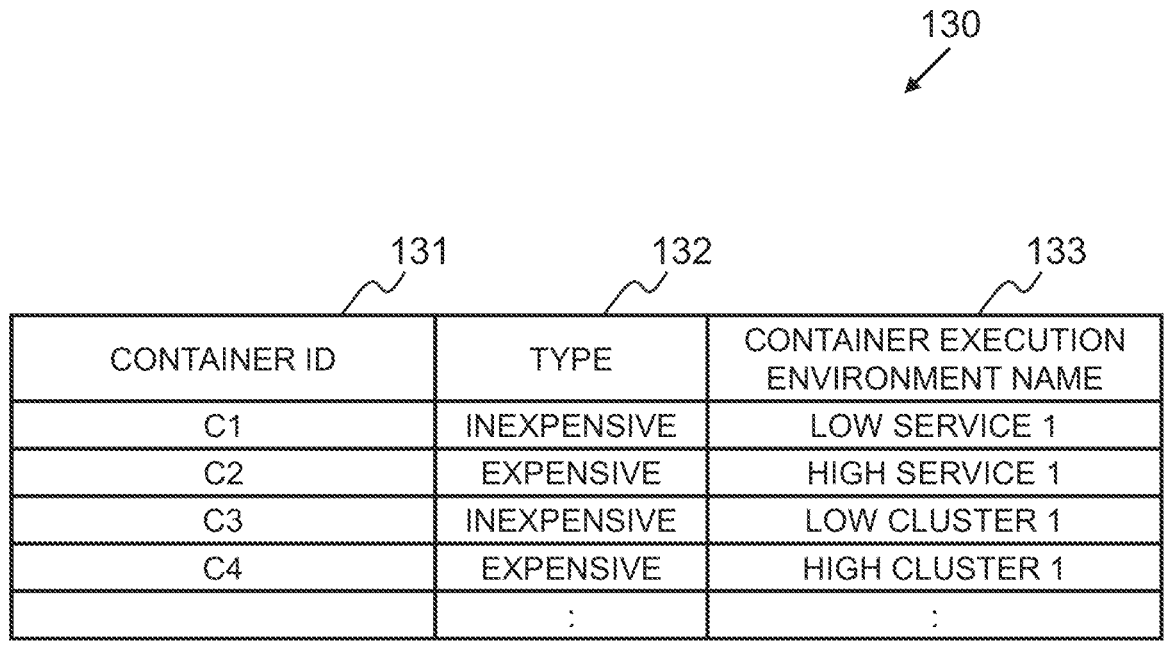
FIG. 6 is a diagram illustrating an example of container execution environment information 130.

FIG. 6 is a diagram illustrating an example of the container execution environment information 130. The container execution environment information 130 stores information about the environment to execute the relevant container. The container execution environment information 130 is configured of a plurality of records; and each record includes a container ID 131, a type 132, and a container execution environment name 133.

The container ID 131 indicates an identifier of the relevant container execution environment and is information of the same type as the container ID 116 in FIG. 4. The type 132 indicates which one of the inexpensive execution unit 11 and the expensive execution unit 13 the container execution environment is. However, referring to FIG. 6, the inexpensive execution unit 11 is described as "inexpensive" and the expensive execution unit 13 is described as "expensive." The container execution environment name 133 indicates the name of the environment where the container is to be executed.

FIG. 7 is a diagram illustrating an example of the maximum parallelism degree information 140. The maximum parallelism degree information 140 stores a maximum parallelism degree, that is, information about the number of subtasks which can be executed simultaneously with respect to each task and at each time of day. The maximum parallelism degree information 140 is created by the task management unit 21. The maximum parallelism degree information 140 is configured of a plurality of records; and each record includes a task ID 141, a date and time 142, and a maximum parallelism degree 143. The task ID 141 is an identifier for identifying the relevant task and is information of the same type as the task ID 101 in FIG. 3. The first record in FIG. 7 shows that regarding "task 0," the maximum of "3" subtasks can be executed simultaneously at "19 o'clock on Dec. 25, 2020."

FIG. 8 is a diagram illustrating an example of the inexpensive executability table 150. The inexpensive executability table 150 is updated by the task management unit 21. The inexpensive executability table 150 stores conditions under which the inexpensive execution unit 11 can be used, with respect to each task and at each time of day. The inexpensive executability table 150 is configured of a plurality of records; and each record includes a task ID 151, an inexpensive remaining quantity 152, and a date and time 153. The task ID 151 is an identifier for identifying the relevant task and is information of the same type as the task ID 101 in FIG. 3. The inexpensive remaining quantity 152 is the number of subtasks which can use the inexpensive execution unit 11 at and after the relevant time of day. In other words, if any uncompleted task(s) exists/exist as many as or more than the number indicated at the relevant time of day, the expensive execution unit 13 will be used.

The first record in FIG. 8 shows that "task 0" cannot use the inexpensive execution unit 11 at and after "4:00 on Dec. 26, 2020." The second record in FIG. 8 shows that regarding "task 0," the number of subtasks which can use the inexpensive execution unit 11 at and after "2:00 on Dec. 26, 2020" is "2." Specifically speaking, by integrating the first to third records indicated in FIG. 8, it is shown that regarding "task 0" on "Dec. 26, 2020," "4" subtasks can use the inexpensive execution unit 11 from 0 o'clock to 2 o'clock, "2" subtasks can use the inexpensive execution unit 11 from 2 o'clock to 4 o'clock, and the inexpensive execution unit 11 cannot be used and all the subtasks use the expensive execution unit 13 after 4 o'clock.

For example, if there is no subtask which is being executed and "3" subtasks remain at "3 o'clock on Dec. 26, 2020", the following processing will be executed. Specifically speaking, "2" subtasks will be executed by the inexpensive execution unit 11 and the remaining "1" subtask will be executed by the expensive execution unit 13.

FIG. 9 is a diagram illustrating an example of the DB information 155 managed by the scale control unit 22. The DB information 155 stores information of the relevant database which operates on the DB server 14. The DB information 155 is configured of a plurality of records; and each record includes a DB ID 156, a connection destination 157, and the number of vCPUs 158. The DB ID 156 indicates an identifier of the relevant database and is information of the same type as the DB ID 122 in FIG. 5. The connection destination 157 indicates information of a connection destination for connecting to the database. The number of vCPUs 158 indicates the number of virtual CPUs used by the database.

FIG. 10 is a diagram illustrating an example of the DB operation information 160 managed by the public monitoring unit 23. The DB operation information 160 stores information of an operation status of the database which operates in the DB server 14. The public monitoring unit 23 adds a new record to the DB operation information 160, for example, every time a specified amount of time has elapsed. The DB operation information 160 is configured of a plurality of records; and each record includes a DB ID 161, a date and time 162, and an average CPU utilization rate 163. The first record in FIG. 10 shows that the average CPU utilization rate of "DB0" was "30%" at "12:00 on Dec. 25, 2020."

FIG. 11 is a diagram illustrating an example of the connection line operation information 170 managed by the public monitoring unit 23. The connection line operation information 170 indicates an operation status of the connection line 4. For example, every time a specified time period has elapsed, the public monitoring unit 231 adds a new record to the connection line operation information 170. The connection line operation information 170 is configured of a plurality of records; and each record includes a connection line ID 171, a date and time 172, a transmitted amount 173, and a received amount 174. The transmitted amount 173 and the received amount 174 may be a specific communication speed or a ratio relative to a maximum value. The first record in FIG. 11 shows that regarding communication of "line 0" at "12:00 on Dec. 25, 2020," the transmitted amount was "20%" and the received amount was "10%."

FIG. 12 is a diagram illustrating an example of the storage information 180 managed by the resource allocation control unit 24. The storage information 180 indicates information of the shared storage 15 which stores data retained by a database operating in the DB server 14. The storage information 180 is configured of a plurality of records; and each record includes a storage ID 181 and a connection destination 182. The storage ID 181 is an identifier of a storage unit which stores the data of the database and is information of the same type as the storage ID 123.

Figure 13:
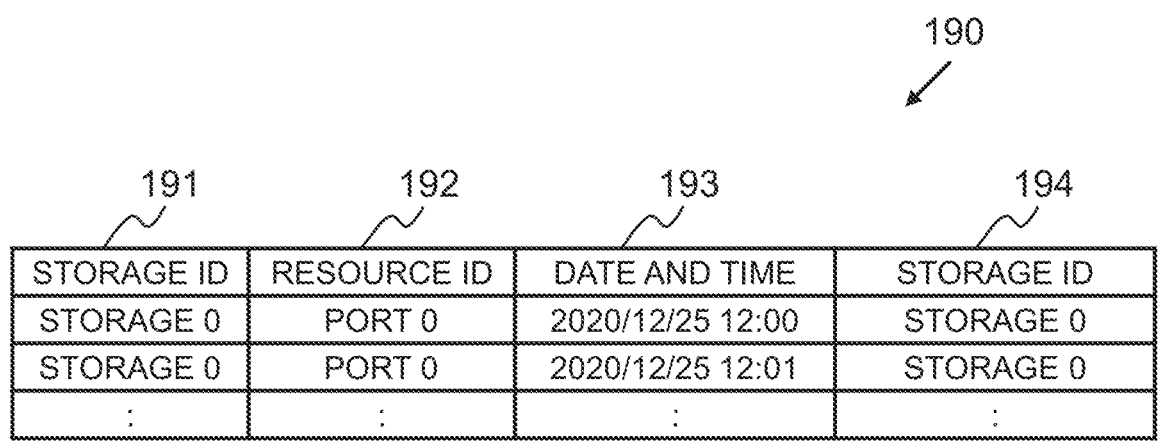
FIG. 13 is a diagram illustrating an example of storage resource operation information 190.

FIG. 13 is a diagram illustrating an example of storage resource operation information 190 managed by the resource allocation control unit 24. The storage resource operation information 190 indicates chronological operation rates of the storage resources. The storage resource operation information 190 is configured of a plurality of records; and each record includes a storage ID 191, a resource ID 192, a date and time 193, and an operation rate 194. The storage ID 191 is an identifier of a storage unit which stores data of a database, and is information of the same type as the storage ID 123. The resource ID 192 is an identifier of the relevant storage resource and is information of the same type as the storage resource ID 124. The operation rate 194 is information indicating an operation status of the resource and indicates, for example, a current load rate relative to the maximum load.

Figure 14:
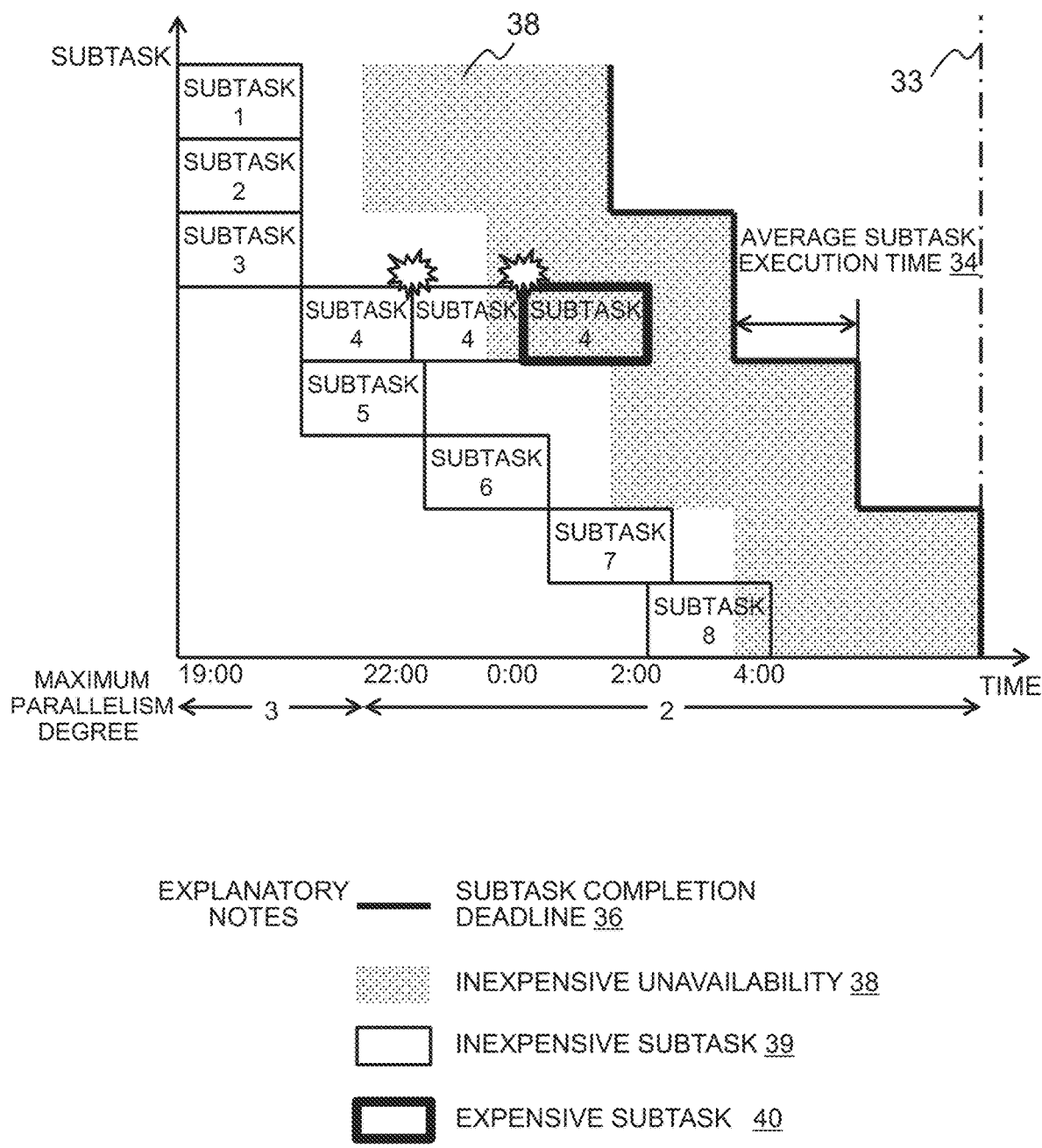
FIG. 14 is a diagram for explaining a method for deciding a container execution service.

FIG. 14 is a diagram for explaining a method for deciding a container execution service. The operator defines processing which they want to execute, as a task. The task designates a container image to be executed. The task is configured of one or more subtasks. There is no dependency relation between subtasks and their sequential execution order is arbitrary as explained earlier. Furthermore, there would be no problem even if the sequential order of executing the subtasks were different from the sequential order of terminating them. An argument to be delivered to the container is defined in a subtask. The subtask is processed by executing the container together with the argument.

Regarding a graph 30, its horizontal axis represents the passage of time; and specifically speaking, time passes from the left to the right of the graph 30. Also, a long-dashed short-dashed line 33 indicated on the right side of the graph 30 indicates the completion date and time 103 which is the time of day when the entire task should be terminated. The vertical axis of the graph 30 represents subtask types; and specifically speaking, subtask 1 to subtask 8 are indicated in the sequential order downwards from the top of the graph 30. Moreover, values of the maximum parallelism degree 143 of the maximum parallelism degree information 140 are indicated at the bottom of the graph 30. An average subtask execution time 34 indicates an average value of the execution time of the subtasks in the past.

A stepped-shape reference numeral 36 indicated with a bold line in FIG. 14 is a subtask completion deadline 36 and indicates the respective subtask completion deadlines to complete the subtasks 1 to 8 in the sequential order. The subtask completion deadline 36 is calculated from the average subtask execution time 34 and the maximum parallelism degree 35. For example, since the remaining amount of the subtasks needs to become zero at the time of day indicated as the reference numeral 33, only the same number of subtasks as the maximum parallelism degree for the relevant time slot, for example, only "2" subtasks are permitted at the time of day earlier than the time of day indicated as the reference numeral 33 by as much as the average subtask execution time 34. Then, at a time of day further earlier than that time of day by as much as the average subtask execution time 34, only subtasks in the quantity which is a numerical value, for example, "4" are permitted, wherein such quantity is obtained by adding the number of the maximum parallelism degree for the relevant time slot to the above-mentioned numerical value, for example, "2."

Inexpensive unavailability 38 indicated with hatching in FIG. 14 indicates time slots when the inexpensive execution unit 11 cannot be used. An area indicated as the inexpensive unavailability 38 is calculated by using the average subtask execution time 34 and the subtask completion deadline 36. Specifically speaking, the time of day obtained by subtracting twice the amount of time of the average subtask execution time 34 from the subtask completion deadline 36 is starting time of the inexpensive unavailability 38.

A subtask surrounded with a narrow-line rectangle in FIG. 14 is an inexpensive subtask 39 executed by using the inexpensive execution unit 11. A subtask surrounded with a bold-line rectangle in FIG. 14 is an expensive subtask 39 executed by using the expensive execution unit 13. If the task management unit 21 cannot use the inexpensive service at the time point when starting to execute each subtask, it uses the expensive execution unit 13. Otherwise, the task management unit 21 uses the inexpensive execution unit 11 to execute the container.

Figure 15:
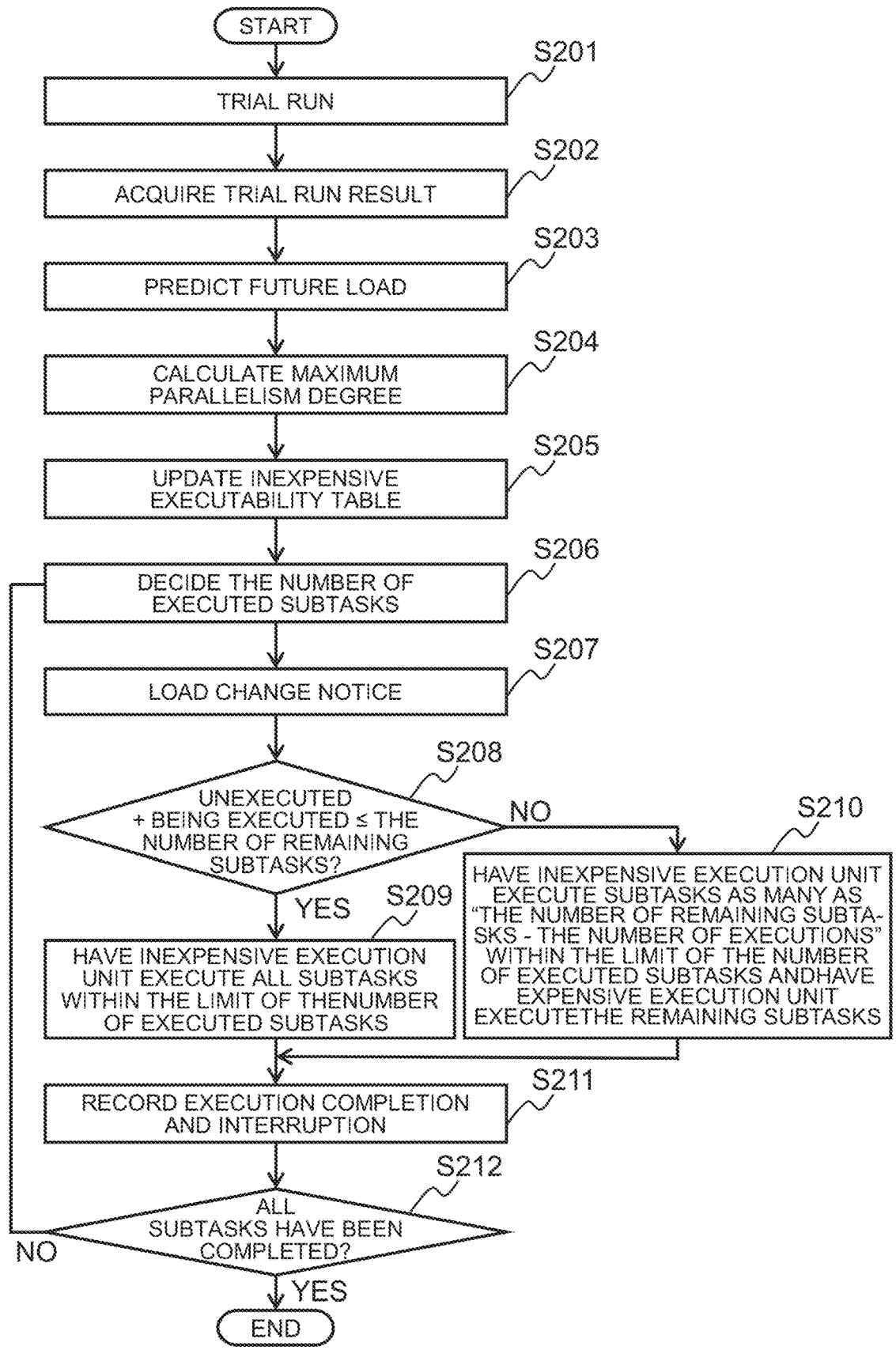
FIG. 15 is a flowchart illustrating task execution processing by the task management unit 21.

FIG. 15 is a flowchart illustrating task execution processing by the task management unit 21. If the current time of day matches any one of the starting dates and times 102 of the task information 100, the task management unit 21 starts the processing illustrated in FIG. 15.

In step S201, the task management unit 21 performs a trial run of a subtask(s). Specifically speaking, the task management unit 21 firstly selects a predetermined number of a subtask(s) from subtasks registered in a started task on the basis of the subtask information 110. Then, the task management unit 21 executes the subtask(s) with predetermined degree of parallelism with respect to a service whose type 132 is "inexpensive" on the basis of the container execution environment information 130.

In the next step S202, the task management unit 21 acquires a trial run result of the subtask(s) executed in step S201. Specifically speaking, the task management unit 21 waits for the completion of the subtask(s) executed in step S201 and acquires the DB operation information 160 and the connection line operation information 170 from the public monitoring unit 23. Furthermore, the task management unit 21 acquires the storage resource operation information 190 from the private monitoring unit 25. The task management unit 21 records average time required to execute the subtask, compares the status before and after the execution of the subtask(s), and records each load amount on the DB server 14, the connection line 4, and the shared storage 15 with respect to one subtask.

In the subsequent step S203, the task management unit 21 calculates a future average CPU utilization rate from the average CPU utilization rates 163 in chronological order which are acquired in step S202.

In the subsequent step S204, the task management unit 21 calculates the maximum number of subtasks which do not reach a predetermined threshold value by adding the average CPU utilization rate per subtask, which was calculated in step S202, to the future average CPU utilization rate calculated in step S203. The task management unit 21 also performs calculations with respect to the transmitted amount 173, the received amount 174, and the operation rate 194 in the same manner. The task management unit 21 records, in the maximum parallelism degree information 140, a minimum value of the quantity of subtasks among the average CPU utilization rate 163, the transmitted amount 173, the received amount 174, and the operation rate 194 which have been calculated, as the maximum parallelism degree in chronological order.

Incidentally, in step S204, the task management unit 21 may consider the influence which, for example, other programs operating in the public cloud 2 or the on-premises data center 3 may have on the connection line 4. For example, the task management unit 21 may calculate the maximum parallelism degree by referring to the operation status of the connection line 4 which was recorded in the connection line operation information 170 at the same time of day one day or one week before, and assuming that the transmitted amount 173, the received amount 174, and so on would change in the same manner on that day. The processing in this step S204 is also called a "simultaneous execution quantity calculation step."

In step S205, the task management unit 21 updates the inexpensive executability table 150 as described below and proceeds to step S206. Firstly, the task management unit 21 records, in the inexpensive executability table 150, a time of day earlier than the completion date and time 103 by as much as twice the subtask execution time measured in step S202 (hereinafter referred to as a "first time of day"), and the quantity of remaining subtasks which is "0."

Next, the task management unit 21 records, in the inexpensive executability table 150, a time of day which is further earlier than the above-mentioned time of day by as much as the subtask execution time (hereinafter referred to as a "second time of day"), and the maximum parallelism degree at the second time of day (hereinafter referred to as a "second remaining quantity"). Furthermore, the task management unit 21 records, in the inexpensive executability table 150, a time of day earlier than the second time of day by as much as the subtask execution time (hereinafter referred to as a "third time of day"), and the sum of the second remaining quantity and the maximum parallelism degree at the third time of day (hereinafter referred to as a "third remaining quantity"). The task management unit 21 repeats this processing no later than the quantity of remaining subtasks becomes the quantity of subtasks described in the subtask information 110. The processing in this step S205 is also called an "inexpensive remaining quantity calculation step."

In step S206, the task management unit 21 reads the maximum parallelism degree at the relevant time of day by referring to the maximum parallelism degree information 140 and subtracts the quantity of subtasks which are being executed from that value. The task management unit 21 decides the result of this subtraction as the quantity of subtasks which should be newly executed. Incidentally, steps S206 to S211 and particularly steps S208 to S210 are also called an "execution instruction step."

In the next step S207, if the maximum parallelism degree at the current time of day has changed as compared to that at the time of execution of a previous task, the task management unit 21 notifies the scale control unit 22 and the resource allocation control unit 24 of a changed amount of the load on the basis of the difference in the parallelism degree and the calculated load amount per subtask. After receiving the notice, the scale control unit 22 changes the number of vCPUs to be allocated to the DB server 14. After receiving the notice, the resource allocation control unit 24 changes the resources to be allocated to the shared storage 15.

In step S208, the task management unit 21 judges whether or not the total quantity of subtasks whose status 115 in the subtask information 110 is "being executed" and "unexecuted" is equal to or less than the inexpensive remaining quantity 152 at the relevant time of day in the inexpensive executability table 150. If the task management unit 21 obtains an affirmative judgment in step S208, it proceeds to step S209; and if the task management unit 21 obtains a negative judgment in step S208, it proceeds to step S210.

In step S209, the task management unit 21: has the inexpensive execution unit 11 execute all subtasks which are "unexecuted" within the limit of the number of executed subtasks; and proceeds to step S211. In step S210, the task management unit 21: has the inexpensive execution unit 11 execute a subtask(s) in the quantity obtained by subtracting the quantity of tasks which are "being executed" from the inexpensive remaining quantity 152 within the limit of the number of executed subtasks; and has the expensive execution unit 13 execute the remaining subtask(s).

Specific examples of steps S206 and S208 to S210 will be explained. Firstly, premises will be explained. It is assumed that the maximum parallelism degree read from the maximum parallelism degree information 140 is "3," the quantity of subtasks which are being executed by the inexpensive execution unit 11 is "1," and the number of subtasks which are being executed by the expensive execution unit 13 is "0." Furthermore, the following premises are set: the maximum parallelism degree at the relevant time of day is "3"; the inexpensive remaining quantity 152 at the relevant time of day is "2"; and the number of tasks whose status 115 in the subtask information 110 is "unexecuted" is "2."

Operations of the task management unit 21 in steps S206 and S208 to S210 in this case are as described below. Firstly, the task management unit 21 calculates the number of executed subtasks in S206 as "3"-"1"="2." Next, the task management unit 21: obtains a negative judgment in S208 because the sum of "2" which is the number of "unexecuted" subtasks and "1" which is the number of a subtask that is "being executed" is larger than "2" which is the inexpensive remaining quantity 152; and then proceeds to S210. Then, in S210, the task management unit 21: has the inexpensive execution unit 11 execute "one" subtask whose number "1" is obtained by subtracting "1" which is the number of the subtask which is being executed, from "2" which is the inexpensive remaining quantity 152; and has the expensive execution unit 13 execute the remaining "one" subtask. In this example, the number of executed subtasks is "2," so that the total of two subtasks can be executed in S210. The explanation will continue by referring back to FIG. 15.

In step S211, the task management unit 21 updates the subtask information 110 with respect to three points described below and proceeds to step S212. The first point is that information of the subtask(s) the execution of which was started in step S209 or step S210 is reflected in the update. Specifically speaking, the task management unit 21 changes the status 115 of a target record of the relevant subtask to "being executed" and sets an identifier of a container execution environment, regarding which a trial is newly started, to the container ID 116. The second point is that information of a subtask(s) which was already being executed, and the execution of which has newly been completed is reflected in the update. Specifically speaking, the task management unit 21 changes the status 115 of a target record of the relevant subtask to "completed" and deletes the container ID 116. The third point is that information of a subtask(s) which was being executed by the inexpensive execution unit 11, but was interrupted is reflected in the update. Specifically speaking, the task management unit 21 changes the status 115 of a target record of the relevant subtask to "unexecuted" and deletes the container ID 116.

In step S212, the task management unit 21 judges whether or not the status 15 of all records of the subtask information 110 is "completed." If the task management unit 21 determines that the status 115 of all the records is "completed," it terminates the processing illustrated in FIG. 15; and if the status 115 of at least one record is not "completed," the processing returns to step S206.

According to the first embodiment described above, the following operational advantages can be obtained.

(1) The arithmetic operation method executed by the task management unit 21 which is a computer uses and causes the arithmetic operation system to perform arithmetic operations of a plurality of subtasks. The arithmetic operation system includes: the inexpensive execution unit 11 for which the usage fee is inexpensive, but which may possibly be forcibly stopped; and the expensive execution unit 13 for which the usage fee is expensive, but which will never be forcibly stopped. The arithmetic operation method executed by the task management unit 21 includes: the simultaneous execution quantity calculation step (step S204) of calculating the simultaneous execution quantity of the subtasks at each time of day on the basis of resources used by each of the subtasks and available resources at each time of day; the inexpensive remaining quantity calculation step (step S205) of creating the inexpensive executability table 150 indicating an inexpensive remaining quantity that is a quantity of tasks which may be executed by the inexpensive execution unit at each time of day on the basis of a completion date and time when the arithmetic operations of the plurality of subtasks should be completed, and the simultaneous execution quantity; and the execution instruction step (steps S206 to S211) of causing each of the subtasks to be executed by either the inexpensive execution unit or the expensive execution unit with reference to the inexpensive executability table. Therefore, the subtask(s) can be completed inexpensively no later than the completion date and time in consideration of the forced stoppage.

(2) The execution instruction step (steps S206 to S211) is to issue an instruction to cause the inexpensive execution unit 11 to execute a new subtask within a limit of the simultaneous execution quantity so that the number of executions of the subtasks by the inexpensive execution unit 11 becomes a maximum quantity which does not exceed the inexpensive remaining quantity; and further cause the expensive execution unit 13 to execute remaining subtasks of the simultaneous execution quantity. Therefore, if the subtask(s) cannot be completed by the completion date and time when it is forcibly stopped, the executions of all the subtasks can be completed no later than the completion date and time by using the expensive execution unit 13.

(3) The inexpensive remaining quantity calculation step (step S205) is to, as in the first record of the created inexpensive executability table 150 in FIG. 8, associate "4:00," which is the first time of day that is the time of day obtained by subtracting twice the amount of the subtask execution time from the ending time of day, with zero. The inexpensive remaining quantity calculation step is to further associate "2:00" that is the time of day obtained by subtracting two hours, which is the subtask execution time, from the first time of day (the second time of day), with the second remaining quantity "2" which is the simultaneous execution quantity at the second time of day. The inexpensive remaining quantity calculation step is to further associate "0:00" that is the time of day obtained by subtracting two hours, which is the subtask execution time, from the second time of day (the third time of day) with the third remaining quantity "4" obtained by adding "2" which is the simultaneous execution quantity to the second remaining quantity "2." Therefore, the inexpensive executability table 150 can be created by a simple arithmetic operation.

(4) The simultaneous execution quantity calculation step is to measure a load on the resources, which is caused by executing the subtasks, and calculate the simultaneous execution quantity on the basis of a remaining amount of the resources at each time of day and the measured load. Therefore, the simultaneous execution quantity can be calculated with high accuracy at each time of day.

(5) The remaining amount of the resources at each time of day is an estimated amount calculated from past statistics. Therefore, periodic variations of the load can be taken into consideration when calculating the simultaneous execution quantity.

(6) Each of the subtasks is executed by using information from the shared storage 15 coupled via the communication path 4. The resources include a resource(s) of the communication path 4 and a resource(s) of the shared storage 15. The simultaneous execution quantity calculation step is to calculate the simultaneous execution quantity at each time of day on the basis of past statistics regarding a load on the shared storage 15 and a load on the communication path 4. Therefore, it is possible to calculate the simultaneous execution quantity in which the loads on the shared storage 15 and the communication path 4 are reflected.

(7) Each of the subtasks reads the information from the shared storage 15 via the database server 14. The resources include a resource(s) of the database server 14. The simultaneous execution quantity calculation step is to calculate the simultaneous execution quantity at each time of day on the basis of past statistics regarding the load on the database server 14. Therefore, it is possible to calculate the simultaneous execution quantity in which the load on the database server 14 is also reflected.

(Variation 1)

The aforementioned embodiment is designed on the premise that the DB server 14, the connection line 4, and the shared storage 15 are not only used by the operator, but are shared with other users and the loads thereby change depending on the date and time. However, it may be designed on the premise that the loads on the DB server 14, the connection line 4, and the shared storage 15 by the other users do not change. Specifically speaking, the following cases may be included: a case where other users do not exist; and a case where the other users exist, but the resources of the DB server 14, the connection line 4, and the shared storage 15 which can be used by the operator are always limited to a constant value. In this case, the processing for the future load prediction as indicated in step S203 in FIG. 15 and the maximum parallelism degree calculation processing in step S204 are mitigated.

(Variation 2)

The aforementioned embodiment takes into consideration the load on the DB server 14 when calculating the maximum parallelism degree indicated in step S204 in FIG. 15. However, the load on the DB server 141 may not be taken into consideration when calculating the maximum parallelism degree. For example, if the DB server 14 has sufficient resources, the calculation of the maximum parallelism degree can be simplified by not taking into consideration the load on the DB server 14 when calculating the maximum parallelism degree.

(Variation 3)

In the aforementioned embodiment, the task management unit 21 is placed in the public cloud 2. However, the task management unit 21 may be placed anywhere as long as it can communicate with the public cloud 2 and the on-premises data center 3. For example, the task management unit 21 may be placed at the on-premises data center 3 or may be placed at any location other than the public cloud 2 or the on-premises data center 3. Furthermore, the task management unit 21 may be implemented by a plurality of hardware apparatuses and these plurality of hardware apparatuses may exist at different locations. For example, the task management unit 21 may be implemented by using resources of the public cloud 2 and the on-premises data center 3.

In each of the aforementioned embodiments and variations, the configuration of functional blocks is merely one example. Some functional configurations which are indicated as separate functional blocks may be integrally configured or the configuration expressed as one functional block diagram may be divided into two or more functions.

Furthermore, part of a function possessed by each functional block may be designed as a configuration which another functional block has.

The aforementioned embodiments and variations may be combined with each other. The various embodiments and variations are explained above, but the present invention is not limited to the details of these embodiments and variations. Other aspects which can be thought of within the scope of the technical idea of the present invention are also included within the scope of the present invention.

REFERENCE SIGNS LIST

2: public cloud
3: on-premises data center
11: inexpensive execution unit
12: container
13: expensive execution unit
14: DB server
15: shared storage
21: task management unit

The invention claimed is:

1. A method executed by a computer comprising:
executing a plurality of subtasks by using either an inexpensive execution unit or an expensive execution unit according to an inexpensive executability table indicating an inexpensive remaining quantity of tasks which may be executed by the inexpensive execution unit at each time of a day based on a simultaneous execution quantity and a completion date and time when the plurality of subtasks should be completed, wherein:
the simultaneous execution quantity is a quantity of the subtasks at each time of the day based on resources used by each of the subtasks during execution at each time of the day, available resources at each time of the day, a load on the resources used, and a remaining amount of the available resources at each time of the day,
the load on the resources used is caused by executing the subtasks,
the inexpensive execution unit may be forcibly stopped during its execution,
the expensive execution unit is never forcibly stopped during its execution,
a usage fee for using the inexpensive execution unit to execute the subtasks is inexpensive,
a usage fee for using the expensive execution unit to execute the subtasks is expensive,
the usage fee for using the expensive execution unit is higher than the usage fee for using the inexpensive execution unit, and
the executing is further to:
execute, by the inexpensive execution unit, subtasks of the subtasks within a limit of the simultaneous execution quantity so that a quantity of executions of the subtasks by the inexpensive execution unit becomes a maximum quantity which does not exceed the inexpensive remaining quantity; and
execute, by the expensive execution unit, remaining subtasks of the subtasks of the simultaneous execution quantity.

2. The method according to claim 1, wherein:
a first time of the day is based on twice an amount of execution time of a subtask and the completion date and time,
the first time of the day has an association with zero in the inexpensive executability table,
a second time of the day is based on the execution time of the subtask and the first time of day,
the second time of the day has an association with a second remaining quantity which is the simultaneous execution quantity at the second time of the day,
a third time of the day is a based on the execution time of the subtask from and the second time of day, and
the third time of the day has an association with a third remaining quantity based on the simultaneous execution quantity at the third time of the day and the second remaining quantity.

3. The method according to claim 1, wherein the remaining amount of the available resources at each time of the day is a constant value or an estimated amount based on statistics.

4. The method according to claim 1, wherein:
each of the subtasks is executed by using information from a storage unit coupled to at least one of the inexpensive execution unit and the expensive execution unit via a communication path,
the resources used include a resource of the communication path and a resource of the storage unit, and
the simultaneous execution quantity at each time of the day is based on statistics regarding a load on the storage unit and a load on the communication path.

5. The method according to claim 4, wherein:
each of the subtasks receives the information from the storage unit via a database server,
the resources used further include a resource of the database server, and
the simultaneous execution quantity at each time of the day is further based on statistics regarding the load on the database server.

6. The method according to claim 1, wherein the inexpensive execution unit and the expensive execution unit are included within a public cloud.

7. The method according to claim 1, wherein information associated with the subtasks includes a task identifier (ID), a subtask ID, an environment variable name, an environment variable value, a status of a respective subtask, and a container ID.

8. The method according to claim 1, wherein information associated with the resources used includes a task identifier (ID), a database ID, a storage ID, and a storage resource ID.

9. The method according to claim 1, wherein the inexpensive execution unit and the expensive execution unit include at least one container execution environment.

10. The method according to claim 9, wherein information associated with the at least one container execution environment includes a container identifier and a container name.

11. A system comprising:
a central processing unit (CPU); and
a memory coupled to the CPU that stores executable instructions that, when executed by the CPU, perform a method comprising:
executing a plurality of subtasks by using either an inexpensive execution unit or an expensive execution unit according to an inexpensive executability table indicating an inexpensive remaining quantity of tasks which may be executed by the inexpensive execution unit at each time of a day based on a simultaneous execution quantity and a completion date and time when the plurality of subtasks should be completed, wherein:

the simultaneous execution quantity is a quantity of the subtasks at each time of the day based on resources used by each of the subtasks during execution at each time of the day, available resources at each time of the day, a load on the resources used, and a remaining amount of the available resources at each time of the day, the load on the resources used is caused by executing the subtasks, the inexpensive execution unit may be forcibly stopped during its execution, the inexpensive execution unit is never forcibly stopped during its execution, a usage fee for using the inexpensive execution unit to execute the subtasks is inexpensive, a usage fee for using the expensive execution unit to execute the subtasks is expensive, the usage fee for using the expensive execution unit is higher than the usage fee for using the inexpensive execution unit, and the executing is further to:
  execute, by the inexpensive execution unit, subtasks of the subtasks within a limit of the simultaneous execution quantity so that a quantity of executions of the subtasks by the inexpensive execution unit becomes a maximum quantity which does not exceed the inexpensive remaining quantity; and
  execute, by the expensive execution unit, remaining subtasks of the subtasks of the simultaneous execution quantity.

12. The system according to claim 11, wherein:
a first time of the day is based on twice an amount of execution time of a subtask and the completion date and time,
the first time of the day has an association with zero in the inexpensive executability table,
a second time of the day is based on the execution time of the subtask and the first time of day,
the second time of the day has an association with a second remaining quantity which is the simultaneous execution quantity at the second time of the day,
a third time of the day is a based on the execution time of the subtask and the second time of day, and
the third time of the day has an association with a third remaining quantity based on the simultaneous execution quantity at the third time of the day and the second remaining quantity.

13. The system according to claim 11, wherein the remaining amount of the available resources at each time of the day is a constant value or an estimated amount based on statistics.

14. The system according to claim 11, wherein:
each of the subtasks is executed by using information from a storage unit coupled to at least one of the inexpensive execution unit and the expensive execution unit via a communication path,
the resources used include a resource of the communication path and a resource of the storage unit, and
the simultaneous execution quantity at each time of the day is based on statistics regarding a load on the storage unit and a load on the communication path.

15. The system according to claim 14, wherein:
each of the subtasks receives the information from the storage unit via a database server,
the resources used further include a resource of the database server, and
the simultaneous execution quantity at each time of the day is further based on statistics regarding the load on the database server.

16. The system according to claim 11, wherein the inexpensive execution unit and the expensive execution unit are included within a public cloud.

17. The system according to claim 11, wherein information associated with the subtasks includes a task identifier (ID), a subtask ID, an environment variable name, an environment variable value, a status of a respective subtask, and a container ID.

18. The system according to claim 11, wherein information associated with the resources used includes a task identifier (ID), a database ID, a storage ID, and a storage resource ID.

19. The system according to claim 11, wherein the inexpensive execution unit and the expensive execution unit include at least one container execution environment.

20. The system according to claim 19, wherein information associated with the at least one container execution environment includes a container identifier and a container name.

* * * * *